United States Patent
Slater et al.

(10) Patent No.: US 11,371,544 B2
(45) Date of Patent: *Jun. 28, 2022

(54) FASTENER WITH ATTACHED COMPRESSION LIMITING SLEEVE

(71) Applicant: Acument Intellectual Properties, LLC, Sterling Heights, MI (US)

(72) Inventors: Jeramiah Slater, Grand Blanc, MI (US); Robert A. Niec, Burt, MI (US); Paul Purdy, Holly, MI (US); Gary Sifferman, Grand Blanc, MI (US)

(73) Assignee: Acument Intellectual Properties, LLC, Sterling Heights, MI (US)

(*) Notice: Subject to any disclaimer, the term of this patent is extended or adjusted under 35 U.S.C. 154(b) by 164 days.

This patent is subject to a terminal disclaimer.

(21) Appl. No.: 16/704,932

(22) Filed: Dec. 5, 2019

(65) Prior Publication Data

US 2020/0109734 A1  Apr. 9, 2020

Related U.S. Application Data

(63) Continuation-in-part of application No. 13/657,339, filed on Oct. 22, 2012, now Pat. No. 10,550,876.

(60) Provisional application No. 61/566,911, filed on Dec. 5, 2011.

(51) Int. Cl.
*F16B 41/00* (2006.01)
*F16B 19/02* (2006.01)
*F16B 5/02* (2006.01)
*F16B 43/00* (2006.01)

(52) U.S. Cl.
CPC ............ *F16B 19/02* (2013.01); *F16B 41/002* (2013.01); *F16B 5/0258* (2013.01); *F16B 43/001* (2013.01)

(58) Field of Classification Search
CPC ....... F16B 43/002; F16B 19/02; F16B 41/002
USPC .................................................. 411/999, 546
See application file for complete search history.

(56) References Cited

U.S. PATENT DOCUMENTS

| | | |
|---|---|---|
| 2,275,315 A | 3/1942 | Ray |
| 2,700,172 A | 1/1955 | Rohe |
| 2,931,412 A | 4/1960 | Wing |
| 3,584,667 A | 6/1971 | Reiland |
| 4,189,979 A | 2/1980 | Silverwood |
| 4,621,961 A | 11/1986 | Gulistan |
| 4,732,519 A | 3/1988 | Wagner |
| 4,941,769 A | 7/1990 | Natsume |
| 5,244,325 A | 9/1993 | Knohl |
| 5,255,647 A | 10/1993 | Kiczek |
| 5,328,311 A | 7/1994 | Knohl |

(Continued)

*Primary Examiner* — Flemming Saether
(74) *Attorney, Agent, or Firm* — Quinn IP Law

(57) ABSTRACT

A fastener system that includes a fastener, a compression-limiting sleeve, and a retainer which generally retains the compression-limiting sleeve on the fastener. By providing that the compression-limiting sleeve is not staked to the fastener, existing technology can be used, and no extra staking processing step needs to be performed. The fastener may comprise a conventional metal threaded screw or bolt, possibly having a recess in its head for receiving a driver. Preferably, the compression-limiting sleeve is cold headed as opposed to being stamped, and preferably includes a counter bore which assures that an end of the retainer is below an end surface of the compression-limiting sleeve. Preferably, the retainer is formed of a thermoplastic elastomer or another suitable material.

13 Claims, 5 Drawing Sheets

(56) References Cited

U.S. PATENT DOCUMENTS

| | | |
|---|---|---|
| 5,336,028 A | 8/1994 | Yamamoto |
| 5,395,194 A | 3/1995 | Johnson et al. |
| 5,577,854 A | 11/1996 | Jacob et al. |
| 5,662,444 A | 9/1997 | Schmidt, Jr. |
| 5,704,572 A | 1/1998 | Vogel et al. |
| 5,807,052 A | 9/1998 | Van Boven et al. |
| 5,871,319 A | 2/1999 | Schneider |
| 5,980,174 A | 11/1999 | Gallagher et al. |
| 6,030,161 A | 2/2000 | Udell et al. |
| 6,044,536 A | 4/2000 | Schneider |
| 6,055,790 A | 5/2000 | Lunde et al. |
| 6,059,503 A | 5/2000 | Johnson |
| 6,225,566 B1 | 5/2001 | Dienst |
| 6,227,783 B1 | 5/2001 | Salameh |
| 6,280,132 B1 | 8/2001 | Szczukowski et al. |
| 6,309,157 B1 | 10/2001 | Amann et al. |
| 6,457,925 B1 | 10/2002 | Genick, II |
| 6,478,519 B1 | 11/2002 | Genick, II |
| 6,685,409 B2 | 2/2004 | Braun et al. |
| 6,761,521 B2 | 7/2004 | McCormack et al. |
| 7,210,885 B2 | 5/2007 | Pinzl |
| 7,708,512 B2 | 5/2010 | McLean et al. |
| 7,771,149 B2 | 8/2010 | Bauer et al. |
| 8,202,031 B2 | 6/2012 | Hartmann |
| 8,202,033 B2 * | 6/2012 | Choi ............... B62D 25/147 411/546 |
| 8,210,784 B2 | 7/2012 | Hartmann |
| 9,302,716 B2 * | 4/2016 | Sahi ............... F16B 5/0635 |
| 9,587,664 B2 | 3/2017 | Bisset et al. |
| 10,550,876 B2 * | 2/2020 | Slater ............... F16B 41/002 |
| 2002/0009350 A1 | 1/2002 | Radtke |
| 2002/0159861 A1 | 10/2002 | Genick, II |
| 2006/0226312 A1 | 10/2006 | Masuch |
| 2008/0095593 A1 | 4/2008 | McLean et al. |
| 2010/0202856 A1 | 8/2010 | Donovan |
| 2013/0142588 A1 | 6/2013 | Slater et al. |
| 2014/0161562 A1 | 6/2014 | Dechant et al. |
| 2019/0107139 A1 | 4/2019 | Hodsdson et al. |

* cited by examiner

FASTENER WITH ATTACHED COMPRESSION LIMITING SLEEVE

RELATED APPLICATION (PRIORITY CLAIM)

This application is a continuation-in-part of U.S. patent application Ser. No. 13/657,339, filed Oct. 22, 2012, which claims the benefit of U.S. Provisional Application Ser. No. 61/566,911, filed Dec. 5, 2011, which are hereby incorporated by reference in their entirety.

BACKGROUND

The present invention generally relates to fasteners, and more specifically relates to a fastener system that has a compression-limiting sleeve effectively attached to a fastener.

In a fastener application where there is a need to limit compression, a conventional fastener system provides that a compression limiting member, such as a stamped sleeve or bushing, is staked to a threaded fastener. The sleeve or bushing, with the threaded fastener staked thereto, is then inserted into a hole which is provided in a first workpiece, and subsequently the fastener is threaded into a threaded bore which is provided in a second workpiece. This secures the first workpiece to the second workpiece, and provides that the sleeve or bushing absorbs compressive forces that otherwise would have to be absorbed by the first workpiece.

Disadvantages of such a fastener system include the fact that staking requires a secondary operation. Additionally, stamping the sleeve or bushing results in significant scrap and provides that tolerances cannot be closely controlled. Furthermore, the system does not readily provide that the column strength of the sleeve or bushing can be changed merely by altering the wall thickness or hardness of the sleeve or bushing.

SUMMARY

An object of an embodiment of the present invention is to provide an improved fastener system for use in an application where compression is relevant or must be absorbed.

Briefly, an embodiment of the present invention provides a fastener system that includes a fastener, such as a threaded bolt or screw, a compression-limiting sleeve, and a retainer which generally retains the compression-limiting sleeve on the fastener. By providing that the compression-limiting sleeve is not staked to the fastener, existing technology can be used, and no extra staking processing step needs to be performed.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
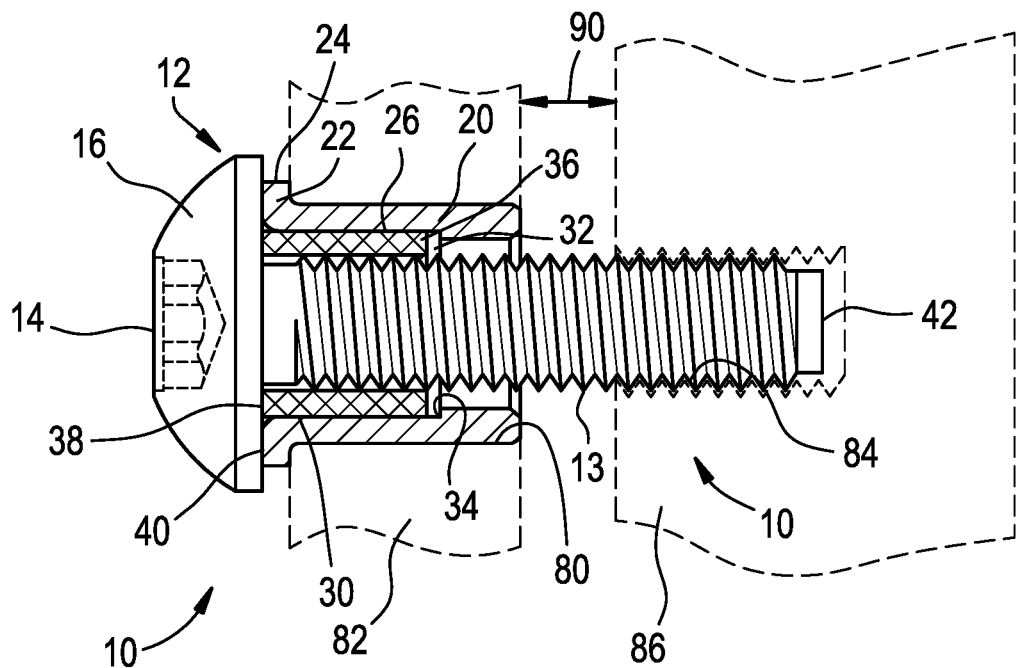
FIG. 1 is a cross-sectional view of a fastener system which is in accordance with an embodiment of the invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

FIG. 1 illustrates a fastener system 10 which in accordance with an embodiment of the present invention. The fastener system 10 is configured for use in applications where limiting compression is relevant. Specifically, the fastener system 10 comprises a fastener 12, such as a conventional threaded screw or bolt, having a threaded shaft portion 13. The fastener 12 is preferably formed of metal, and preferably incorporates a drive system (such as a recess 14 on a head 16 of the fastener 12) to transfer tightening torque, such as a drive system consistent with that which is disclosed in U.S. Pat. No. 3,584,667, for example. While the fastener 12 is shown as having a head 16 with a recess 14, the present invention can be employed with effectively any head style with regard to the fastener 12.

The fastener system 10 also comprises a compression-limiting sleeve 20. Preferably, the compression-limiting sleeve 20 is also formed of metal, and is preferably cold headed as opposed to being stamped. This not only results in significantly less scrap, but also provides that both the outer diameter and the inner diameter of the compression-limiting sleeve 20 can be formed to a tight tolerance. Preferably, the compression-limiting sleeve 20 is generally cylindrical, but may include a lip 22 at one end 24 thereof as shown in FIG. 1. As shown, the compression-limiting sleeve 20 also preferably includes an internal counter bore 26. The function of this counter bore 26 will be described more fully hereinbelow. Preferably, the compression-limiting sleeve 20 has a minimum bearing surface which is engineered to effectively meet the strength of the fastener 12 being used in the system 10. While the compression-limiting sleeve 20 is shown as having a lip 22, the present invention can be employed with or without the lip 22.

Figure 2:
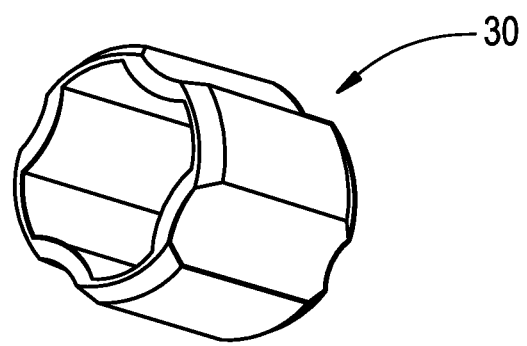
FIG. 2 is a perspective view of a retainer component of the fastener system shown in FIG. 1.

As shown in FIG. 1, the fastener system 10 also comprises a retainer 30. The retainer 30 is configured to generally retain the compression-limiting sleeve 20 on the fastener 12, without having to physically stake the compression-limiting sleeve 20 to the fastener 12. Preferably, the retainer 30 is formed of a thermoplastic elastomer or another suitable material. Specifically, the retainer 30 may have a profile as shown in FIG. 2, and specifically may be provided as being consistent with that which is disclosed in U.S. Pat. No. 5,395,194; Reissue No. 36,164; and U.S. Pat. No. 6,039,525. As shown in FIG. 1, the fastener 12 extends through the retainer 30, and the retainer 30 is disposed generally between the fastener 12 and the compression-limiting sleeve 20. Preferably, the retainer 30 retains the fastener 12 relative to the compression-limiting sleeve 20 such that the fastener 12 can float longitudinally, such as at least 1 mm, to facilitate alignment during installation.

Figure 3:
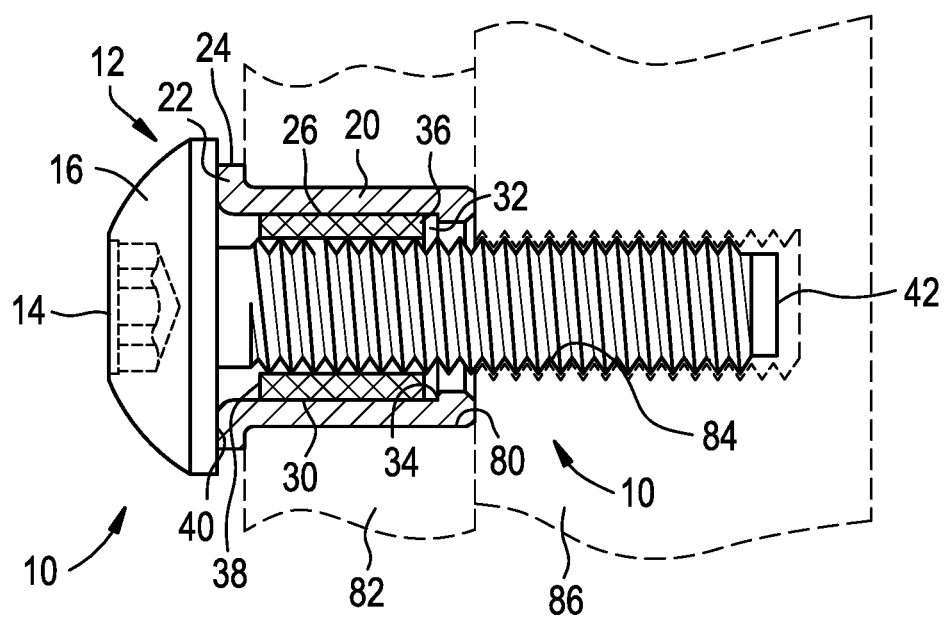
FIG. 3 is a cross-sectional view much like FIG. 1, but shows the fastener system in the installed state.

As discussed briefly above, the compression-limiting sleeve 20 preferably includes a counter bore 26. The space 32 between an internal shoulder 34 of the counter bore 26 of the compression-limiting sleeve 20 and the one end 36 of the retainer 30 assures that the other end 38 of the retainer 30 will be below an end surface 40 of the compression-limiting sleeve 20 once the fastener system 10 is installed, as shown in FIG. 3 which is a cross-sectional view much like FIG. 1, but shows the fastener system 10 post installation.

To install the fastener system 10, the compression-limiting sleeve 20, while being retained on the fastener 12 by the retainer 30, is inserted in a hole 80 in a first workpiece 82 (see FIG. 1). Then, an end 42 of the fastener 12 is aligned with a threaded bore 84 in a second workpiece 86. A driver is engaged with the recess 14 in the head 16 of the fastener 12, and the driver is actuated to drive the fastener 12 into the second workpiece, thereby effectively securing the second workpiece to the first workpiece (as indicated by arrow 90 in FIG. 1), as shown in FIG. 3. During and after installation, the compression-limiting sleeve limits or absorbs compressive forces which otherwise would impact the first workpiece.

As discussed above, preferably the compression-limiting sleeve 20 is cold headed as opposed to being stamped. This not only results in significantly less scrap, but also provides that the compression-limiting sleeve 20 can be formed to tighter tolerances. Additionally, because the retainer 30 functions to retain the compression-limiting sleeve 20 on the fastener 12 as opposed to the compression-limiting sleeve 20 having to be staked on the fastener 12, a secondary staking operation need not be performed and existing technology can be utilized to assemble and hold the components of the fastener system 10 together. Furthermore, the fastener system 10 provides that the column strength of the compression-limiting sleeve 20 can be easily matched to the application by varying the wall thickness or hardness (or both) of the compression-limiting sleeve 20.

Figure 4:
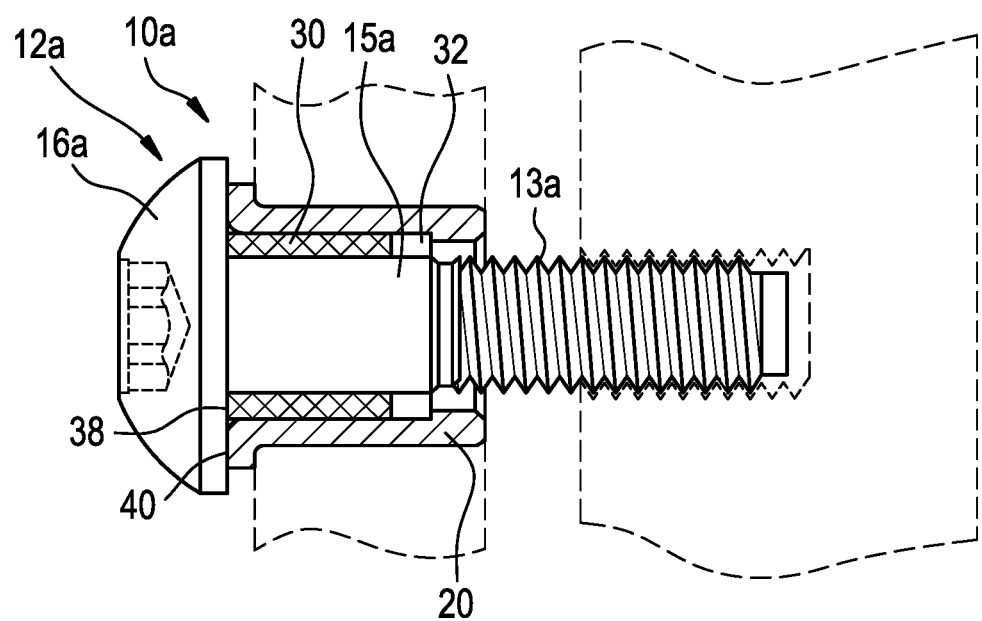
FIGS. 4-6 are cross-sectional views of fastener systems that are in accordance with alternative embodiments of the invention.
Figure 5:
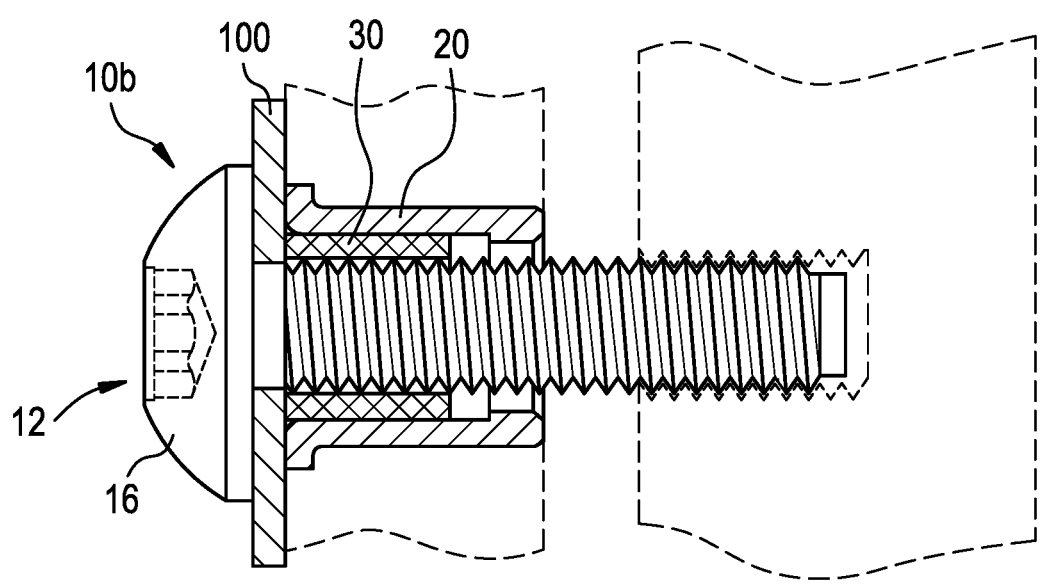
Figure 6:
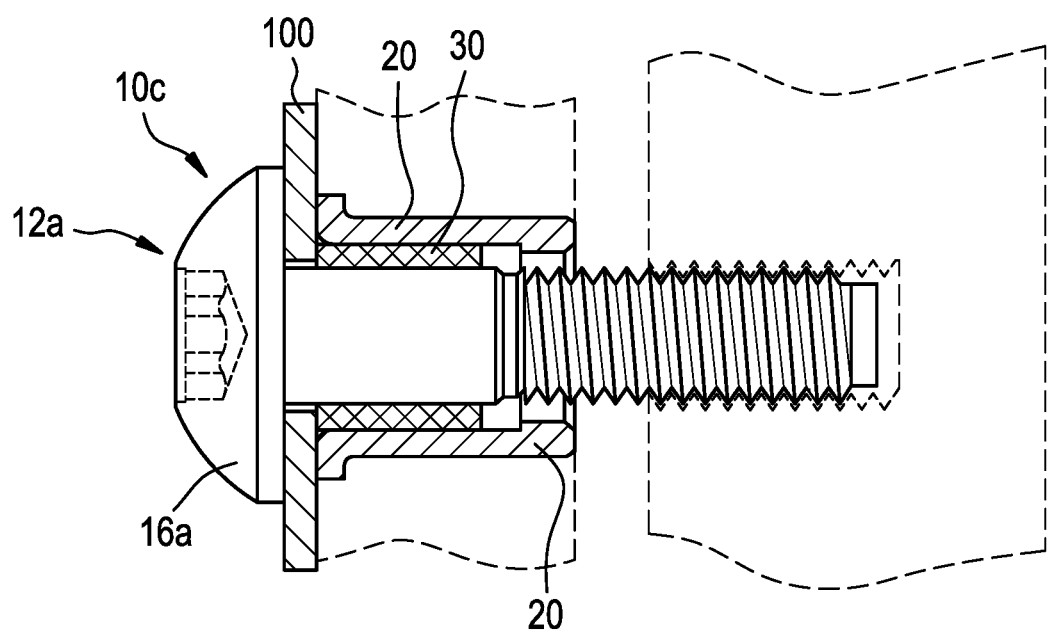

FIGS. 4-6 are cross-sectional views of fastener systems 10a, 10b, 10c that are in accordance with alternative embodiments of the invention. The fastener systems 10a, 10b, 10c have a lot of similarities with the fastener system 10 described previously, so like reference numerals will be used to identify like parts and only the differences will be emphasized.

FIG. 4 illustrates a fastener system 10a that is very much like fastener system 10 described previously (shown in FIGS. 1-3), the only difference being in addition to having a head 16a and a threaded portion 13a, the fastener 12a also includes a non-threaded portion 15a. As shown n FIG. 4, it is the non-threaded portion 15a of the fastener 12a that engages the retainer 30 (i.e., the same retainer 30 as described previously), for the purpose of generally retaining the compression-limiting sleeve 20 on the fastener 12a. Much like the fastener 12, the fastener 12a extends through the retainer 30, and the retainer 30 is disposed generally between the fastener 12a and the compression-limiting sleeve 20. Preferably, the retainer 30 retains the fastener 12a (i.e., by engaging the non-threaded portion 15a) relative to the compression-limiting sleeve 20 such that the fastener 12a can float longitudinally, such as at least 1 mm, to facilitate alignment during installation. As with the fastener system 10, fastener system 10a provides space 32, and this space 32 assures that end 38 of the retainer 30 will be below an end surface 40 of the compression-limiting sleeve 20 once the fastener system 10a is installed (i.e., like shown in FIG. 3).

The fastener system 10a shown in FIG. 4 provides enhanced retention compared to fastener system 10 due to the fact that there is more contact area between the non-threaded portion 15a of the fastener 12a and the retainer 30 than there is between the threaded portion 13 of fastener 12 and the retainer 30. There is also enhanced strength between the head 16a and the rest of the fastener 12a than there is between head 16 and the rest of fastener 12 as shown in FIG. 1.

FIG. 5 illustrates a fastener system 10b that is identical to fastener system 10 shown in FIG. 1, but includes a washer 100 that is disposed under the head 16 of the fastener 12, specifically between the head 16 of the fastener 12 and the compression-limiting sleeve 20. The retainer 30 retains both the washer 100 and the compression limiting sleeve 20. The washer 100 functions to increase the surface area to reduce unit loading on the mating component.

FIG. 6 illustrates a fastener system 10c that is identical to fastener system 10a shown in FIG. 4, but includes a washer 100 that is disposed under the head 16a of the fastener 12a, specifically between the head 16a of the fastener 12a and the compression-limiting sleeve 20. The retainer 30 retains both the washer 100 and the compression limiting sleeve 20. The fastener system 10c provides a lot of the same advantages of fastener system 10a (i.e., increased surface area between the fastener 12a and the retainer 30, and enhanced head strength), but the washer 100 also functions to increase the surface area to reduce unit loading on the mating component.

While specific embodiments of the invention have been shown and described, it is envisioned that those skilled in the art may devise various modifications without departing from the spirit and scope of the present invention.

What is claimed is:

1. A stand-alone, installable fastener system comprising: a fastener having a non-threaded portion and a threaded portion; a compression-limiting sleeve having an end surface; and a retainer comprising a thermoplastic elastomer which engages the compression-limiting sleeve and which comprises parallel internal walls which extend from one end of the retainer to an opposite end of the retainer, wherein the parallel internal walls engages at least one of the non-threaded portion and the threaded portion of the fastener such that the fastener floats longitudinally to facilitate alignment pre-installation, wherein the retainer comprises a first end and a second end, wherein the compression-limiting sleeve comprises a counter bore, wherein the retainer engages the counter bore of the compression limiting sleeve and at least one of the non-threaded portion and the threaded portion of the fastener such that the retainer retains the compression-limiting sleeve on the fastener, wherein the counter bore comprises an internal shoulder, wherein a space is provided between the internal shoulder of the counter bore of the compression-limiting sleeve and the first end of the retainer, said space configured to provide that the second end of the retainer is disposed below the end surface of the compression-limiting sleeve after installation.

2. A stand-alone, installable fastener system as recited in claim 1, wherein the retainer is positioned between the fastener and the compression-limiting sleeve.

3. A stand-alone, installable fastener system as recited in claim 1, wherein the retainer is positioned between the fastener and the compression-limiting sleeve, and the retainer contacts the fastener and contacts the compression-limiting sleeve.

4. A stand-alone, installable fastener system as recited in claim 1, wherein the fastener comprises a metal threaded fastener.

5. A stand-alone, installable fastener system as recited in claim 1, wherein the fastener comprises a head having a recess therein.

6. A stand-alone, installable fastener system as recited in claim 1, wherein the compression-limiting sleeve is metal.

7. A stand-alone, installable fastener system as recited in claim 1, wherein the compression-limiting sleeve has a lip proximate the end surface.

8. A stand-alone, installable fastener system as recited in claim 1, wherein the compression-limiting sleeve is cold headed.

9. A stand-alone, installable fastener system as recited in claim 1, wherein the retainer comprises a bore through which the fastener extends.

10. A stand-alone, installable fastener system as recited in claim 1, wherein the fastener comprises a head.

11. A stand-alone, installable fastener system as recited in claim 1, wherein the compression-limiting sleeve has an interior surface, and the retainer contacts the interior surface of the compression-limiting sleeve.

12. A stand-alone, installable fastener system as recited in claim 1, wherein the retainer comprises parallel external walls which extend from the one end of the retainer to the opposite end of the retainer, wherein the parallel external walls engage an internal surface of the compression-limiting sleeve.

13. A stand-alone, installable fastener system as recited in claim 1, further comprising:
   a washer, wherein the washer and the compression limiting sleeve are retained by the retainer.

* * * * *